United States Patent
Niwa (10) Patent No.: US 8,013,894 B2
(45) Date of Patent: Sep. 6, 2011

(54) IMAGE CAPTURING APPARATUS AND CONTROL METHOD THEREOF WITH ATTITUDE CONTROL

(75) Inventor: Chiyumi Niwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1174 days.

(21) Appl. No.: 11/227,774

(22) Filed: Sep. 14, 2005

(65) Prior Publication Data

US 2006/0061659 A1 Mar. 23, 2006

(30) Foreign Application Priority Data

Sep. 17, 2004 (JP) ................................. 2004-272507

(51) Int. Cl.
*H04N 5/228* (2006.01)

(52) U.S. Cl. ................................................ 348/208.16

(58) Field of Classification Search ............... 348/208.3, 348/333.12, 208.16; 382/216
See application file for complete search history.

(56) References Cited

U.S. PATENT DOCUMENTS

| | | | | |
|---|---|---|---|---|
| 5,499,074 A | * | 3/1996 | Ohsawa et al. | 396/121 |
| 5,764,291 A | * | 6/1998 | Fullam | 348/362 |
| 6,262,769 B1 | * | 7/2001 | Anderson et al. | 348/333.1 |
| 6,529,144 B1 | * | 3/2003 | Nilsen et al. | 341/20 |
| 2001/0053703 A1 | * | 12/2001 | Kobayashi | 455/556 |
| 2004/0085470 A1 | * | 5/2004 | Miyashita | 348/333.11 |
| 2004/0239792 A1 | * | 12/2004 | Shibutani et al. | 348/333.12 |
| 2005/0216867 A1 | * | 9/2005 | Marvit et al. | 715/863 |
| 2005/0219211 A1 | * | 10/2005 | Kotzin et al. | 345/158 |
| 2006/0044268 A1 | * | 3/2006 | Robin et al. | 345/158 |

FOREIGN PATENT DOCUMENTS

| | | |
|---|---|---|
| JP | 10-301750 A | 11/1998 |
| JP | 2003-51977 | 2/2003 |
| JP | 2003-274366 | 9/2003 |

OTHER PUBLICATIONS

Chinese Office Action dated Jun. 8, 2007 for Chinese counterpart application No. 2005101029991 (with English translation).
The above reference was cited in a Feb. 23, 2010 Japanese Office Action, which is enclosed without an English Translation, that issued in Japanese Patent Application No. 2004-272507.

* cited by examiner

*Primary Examiner* — Sinh Tran
*Assistant Examiner* — Albert Cutler
(74) *Attorney, Agent, or Firm* — Cowan, Liebowitz & Latman, P.C.

(57) ABSTRACT

An image capturing apparatus includes an image capture unit for capturing an image, a reproducing unit for reproducing and displaying an image, an attitude detecting unit for detecting an attitude, and a control unit for executing a preset and predetermined operation if a predetermined attitude change pattern is detected with the attitude detecting unit.

14 Claims, 6 Drawing Sheets

ATTITUDE 1

FIG. 3D

ATTITUDE 4

FIG. 3B

ATTITUDE 2

FIG. 3C

ATTITUDE 3

IMAGE CAPTURING APPARATUS AND CONTROL METHOD THEREOF WITH ATTITUDE CONTROL

BACKGROUND OF THE INVENTION

1. Field of the Invention

The present invention relates to an image capturing apparatus such as a digital camera and a digital video camera and control method thereof.

2. Description of Related Art

As a conventional digital camera, there is a digital camera of the type that objective functions are operated by using a menu button, a four-way operational button, a SET button and the like (for example, refer to Japanese Patent Laid-open Publication No. 2003-51977). The objective functions include a function of selecting the number of frames of captured images stored in a memory card to be displayed on a liquid crystal display unit, a function of changing the captured image displayed on the liquid crystal display unit to the next or previous captured image, and other functions.

Erroneous operations may be performed, however, in the state that an objective button is difficult to be visually recognized, such as in a dark environment and in the state that an objective button is hard to be manipulated.

SUMMARY OF THE INVENTION

The present invention is to overcome the above-described drawbacks. For example, the present invention aims to attain easy operation which can make an image capturing apparatus execute a predetermined operation even in the state that an objective button is difficult to be visually recognized and in the state that an objective button is hard to be manipulated.

According to an aspect of the present invention, an image capturing apparatus of the present invention comprises: an image capture unit for capturing an image; a reproducing unit for reproducing and displaying an image; an attitude detecting unit for detecting an attitude; and a control unit for executing a predetermined operation set in advance if a predetermined attitude change pattern is detected with the attitude detecting unit.

According to another aspect of the present invention, a method of the present invention, of controlling an image capturing apparatus which includes an image capture unit for capturing an image, a reproducing unit for reproducing and displaying an image and an attitude detecting unit for detecting an attitude, the method comprising step of: controlling the image capturing apparatus to execute a predetermined operation set in advance if a predetermined attitude change pattern is detected with the attitude detecting unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWING

The accompanying drawings, which are incorporated in and constitute a part of the specification, illustrate embodiments of the present invention and, together with the description, serve to explain the principles of the present invention.

DETAILED DESCRIPTION OF THE EMBODIMENTS

Embodiments of the present invention will be described in detail with reference to the drawings.

First Embodiment

Figure 1:
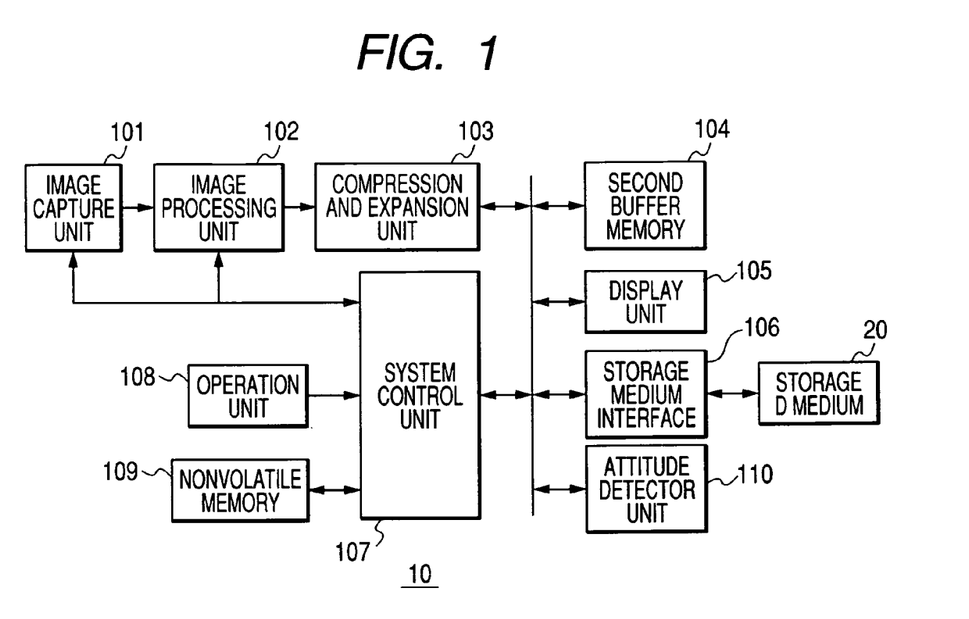
FIG. 1 is a diagram showing an example of the structure of a digital camera according to a first embodiment of the present invention.

FIG. 1 is a diagram showing an example of the structure of a digital camera 10. The first embodiment of the present invention is not limited to the digital camera, but is applicable to other image capturing apparatuses such as a digital video camera, a portable phone with a camera, and a computer with a camera.

As a shutter button is full-depressed, an image capture unit 101 converts light received with an image capture element (CCD image sensor, CMOS image sensor or the like) into an electric signal, digitalizes the electric signal to form a digital image, and supplies the digital image to an image processing unit 102.

The image processing unit 102 executes a development process on the digital image supplied from the image capture unit 101. The development process includes white balance adjustment, sharpness adjustment, contrast adjustment and the like. The image processing unit 102 also changes a resolution and the like of the digital image after the development process. Development parameters necessary for the development process can be set by a user.

A compression and expansion unit 103 has a function of compressing the digital image processed by the image processing unit 102 by an image compression method such as JPEG and JPEG2000 and a function of expanding a compressed digital image. A compression factor can be set by a user.

A system control unit 107 has a micro computer for controlling the digital camera 10 in accordance with a control program in a non-volatile memory 109. The system control unit 107 has a function of creating an image file including digital images compressed by the compression and expansion unit 103 and additional information of the digital images, and storing the created image file in an internal memory (second buffer memory) 104. The additional information includes information on a digital image, information on the digital camera 10, a thumbnail of digital images and the like. The internal memory 104 has a capacity enough to store a plurality of image files.

The system control unit 107 also has a function of setting the digital camera 10 in a power saving state. In the power saving state of the digital camera 10, the system control unit 107 turns off some functions of the digital camera 10 to reduce a battery consumption power.

A display unit 105 has a display such as a liquid crystal display and displays various information on the display. The display unit 105 has a function of displaying information on the digital camera 10, a function of displaying captured images, a function of displaying captured images stored in a storage medium 20, and other functions. When captured images stored in the storage medium 20 are displayed, information on the captured images can also be displayed. The display unit 105 also has a function of providing a graphical user interface such as setting menus.

A storage medium interface 106 has a function of writing an image file stored in the internal memory 104 into the storage medium 20 and a function of reading an image file stored in the recording medium 20 and writing it into the internal memory 104. Captured images in the image file read from the storage medium 20 and written in the internal memory 104 are displayed on the display unit 105 under the control of the system control unit 107.

An operation unit 108 is a user interface for operating the digital camera 10, and has a power switch for turning on and off a power of the digital camera 10, a shutter button, menu buttons for displaying setting menus on the display unit 105, a four-way operational button for moving a cursor displayed on the display unit 105 up and down, right and left, a SET button for setting an image, an item, a value or the like selected with the cursor to the digital camera 10 or for making the digital camera 10 select the information selected with the cursor, and other buttons. The shutter button can be half-depressed or full-depressed. As the shutter button is half-depressed, the digital camera 10 executes AF, AE or the like, whereas the shutter button is full-depressed, the digital cameral 10 executes digital image capturing.

The non-volatile memory 109 stores the control program for controlling the digital camera 10 and information on the digital camera 10 and the like. The non-volatile memory 109 stores also image data corresponding to setting menus to be displayed on the display unit 105.

An attitude detector unit 110 judges an attitude of the digital cameral 10 and notifies the judgement results to the system control unit 107. For example, the attitude detector unit 110 may use a gravitational sensor. The attitude detector unit 110 continues to judge an attitude of the digital camera 10 and notifies the judgement results to the system control unit 107, while the digital camera 10 is turned ON or is in the power saving state.

The storage medium 20 may be a memory card (a card having a built-in non-volatile memory), a hard disk drive or the like. The storage medium 20 can be mounted on the digital camera 10 or dismounted from the digital camera 10.

Figure 2:
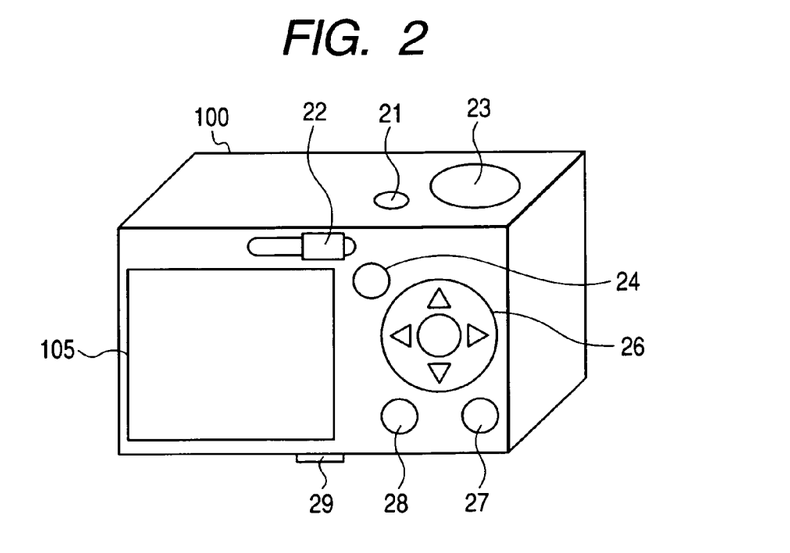
FIG. 2 is a diagram showing a perspective of the digital camera according to the first embodiment of the present invention.

FIG. 2 is a diagram showing an example of a perspective of the digital camera 10. A power button 21 is used for turning ON or OFF the power of the digital camera 10. A mode turnover switch 22 is used for selecting a capturing mode for capturing an image, and a reproducing mode for displaying, digital images (still images and moving images) reproduced in the storage medium such as a memory card.

A shutter button 23 has a first release switch for instructing the start of AF, AE or the like and a second release switch for instructing the start of capturing still images or moving images. The first release switch becomes on when the shutter button 23 is half-depressed, and the second release switch becomes on when the shutter button 23 is full-depressed.

A menu button 24 is used for displaying setting menus on the display unit 105, the setting menus being used for changing settings of the digital camera 10.

A four-way directional button 26 is used for moving the cursor displayed on the display unit 105, up and down, right and left.

A SET button 27 is used for setting an image, an item, a value or the like selected with the cursor to the digital camera 10 or for making the digital camera 10 select the information selected with the cursor.

A display button 28 is used for turning ON or OFF the display unit 105.

A tripod connector 29 is used for connecting a tripod.

In the first embodiment, the power button 21 and shutter button 23 are arranged on the upper surface of the digital camera 10, the mode turnover switch 22, menu button 24, display unit 105, four-way directional button 26, SET button 27 and display button 28 are arranged on the rear surface of the digital camera 10, and the tripod connector 29 is arranged on the bottom surface of the digital camera 10.

Figure 3A:
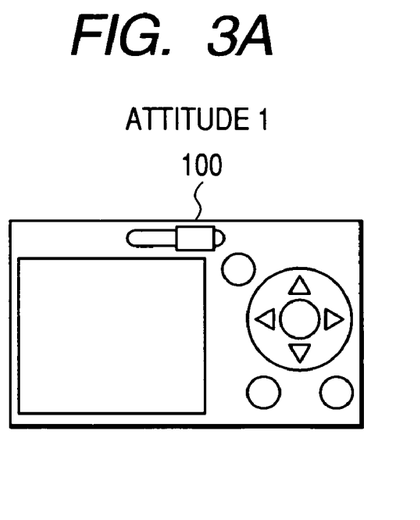
FIGS. 3A, 3B, 3C and 3D are diagrams showing four attitudes judged by the digital camera shown in FIG. 1.

FIGS. 3A to 3D are diagrams showing four attitudes judged by the attitude detector unit 110. As shown in FIG. 3A, the attitude detector unit 110 judges that the attitude of the digital camera 10 takes an "attitude 1" if the upper surface (surface with the shutter button 23) of the digital camera 10 is oriented upward and the lower surface (surface with the tripod connector 29) is oriented downward.

Figure 3B:
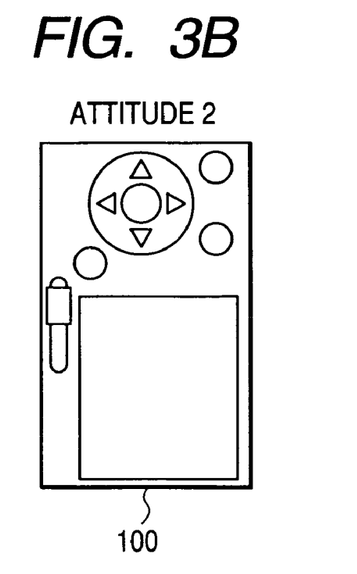

As shown in FIG. 3B, the attitude detector unit 110 judges that the attitude of the digital camera 10 takes an "attitude 2" if the upper surface of the digital camera 10 is oriented left and the lower surface is oriented right.

Figure 3C:
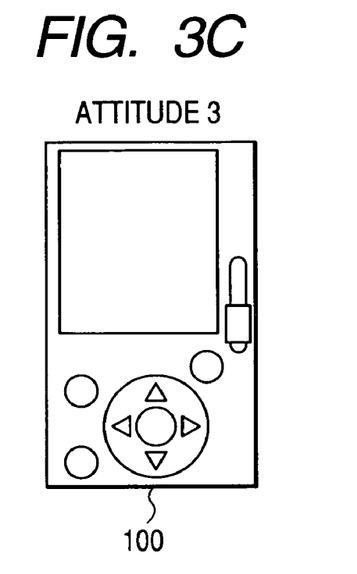

As shown in FIG. 3C, the attitude detector unit 110 judges that the attitude of the digital camera 10 takes an "attitude 3" if the upper surface of the digital camera 10 is oriented right and the lower surface is oriented left.

Figure 3D:
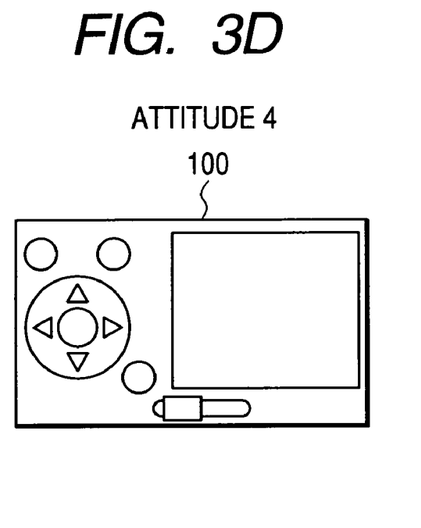

As shown in FIG. 3D, the attitude detector unit 110 judges that the attitude of the digital camera 10 takes an "attitude 4" if the lower surface of the digital camera 10 is oriented upward and the upper surface is oriented downward.

The attitudes 1 and 4 are horizontal and the attitudes 2 and 3 are vertical. The attitude 4 is turned upside down from the attitude 1, and the attitude 3 is turned upside down from the attitude 2.

Figure 4:
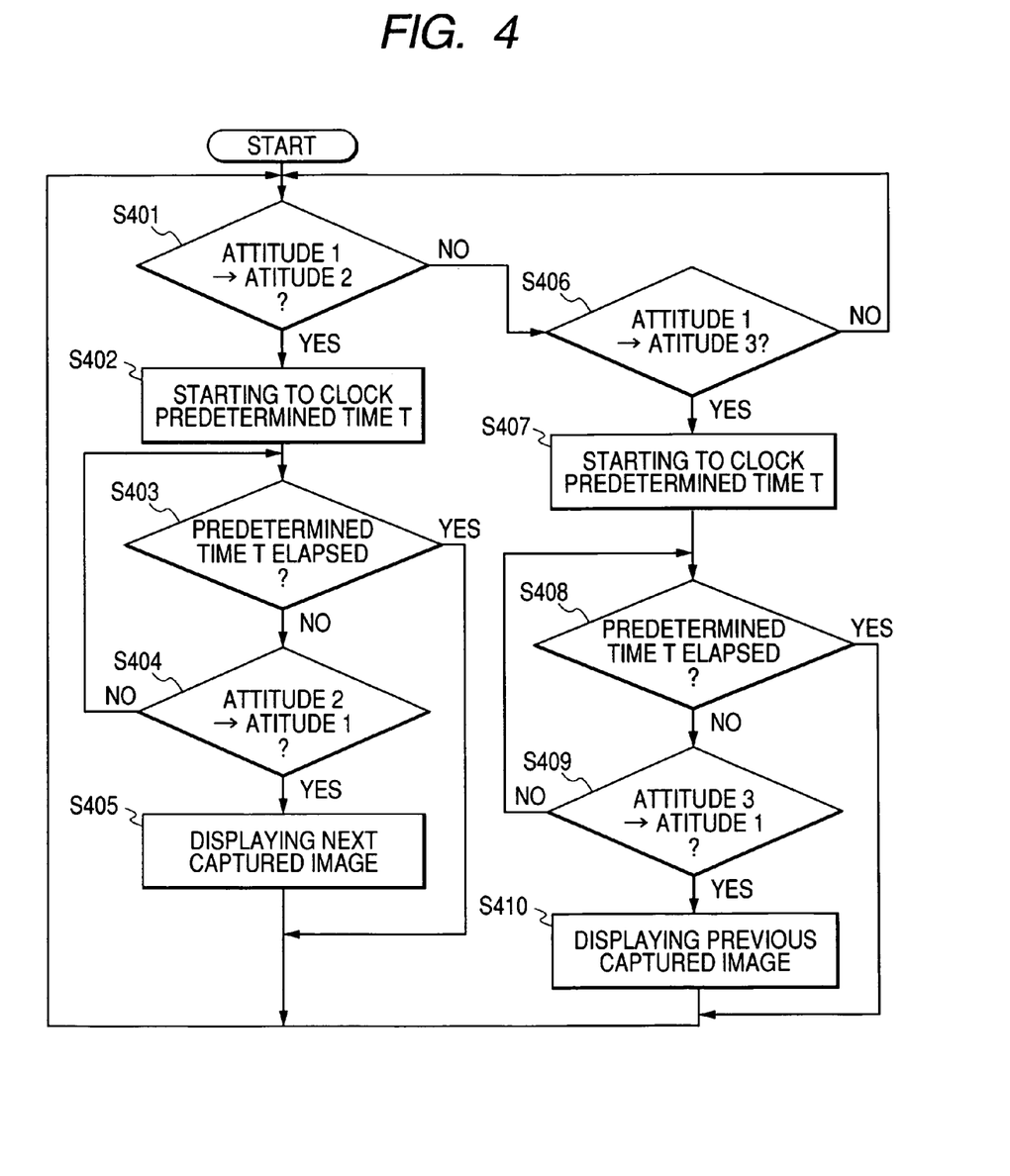
FIG. 4 is a flow chart illustrating an example of a sequence of processes to be executed by the digital camera according to the first embodiment of the present invention.

FIG. 4 is a flow chart illustrating an example of a sequence of processes to be executed by the digital camera 10. The processes shown in FIG. 4 are executed by the system control unit 107 which controls the digital camera 10 in accordance with the control program in the memory 109. The processes shown in FIG. 4 is executed when an attitude change function on the setting menu is turned ON.

Step S401: The system control unit 107 judges from the judgement results by the attitude detector unit 110 whether the attitude of the digital camera 10 changes from the attitude 1 to attitude 2. If it is judged that the attitude of the digital camera 10 changed from the attitude 1 to attitude 2, the flow advances to Step S402, whereas if not, the flow advances to Step S406.

Step S402: The system control unit 107 starts clocking for a predetermined time T.

Step S403: The system control unit 107 judges whether the predetermined time T lapsed. If not, the flow advances to Step S404, whereas if lapsed, the flow returns to Step S401.

Step S404: The system control unit 107 judges from the judgement results by the attitude detector unit 110 whether the attitude of the digital camera 10 is returned from the attitude 2 to attitude 1. Namely, the system control unit 107 judges whether the attitude of the digital camera 10 returns to the original attitude before the predetermined time T is lapsed. If it is judged that the attitude of the digital camera 10 is returned from the attitude 2 to attitude 1, the flow advances to Step S405, whereas if not, the flow returns to Step S403.

Figure 5:
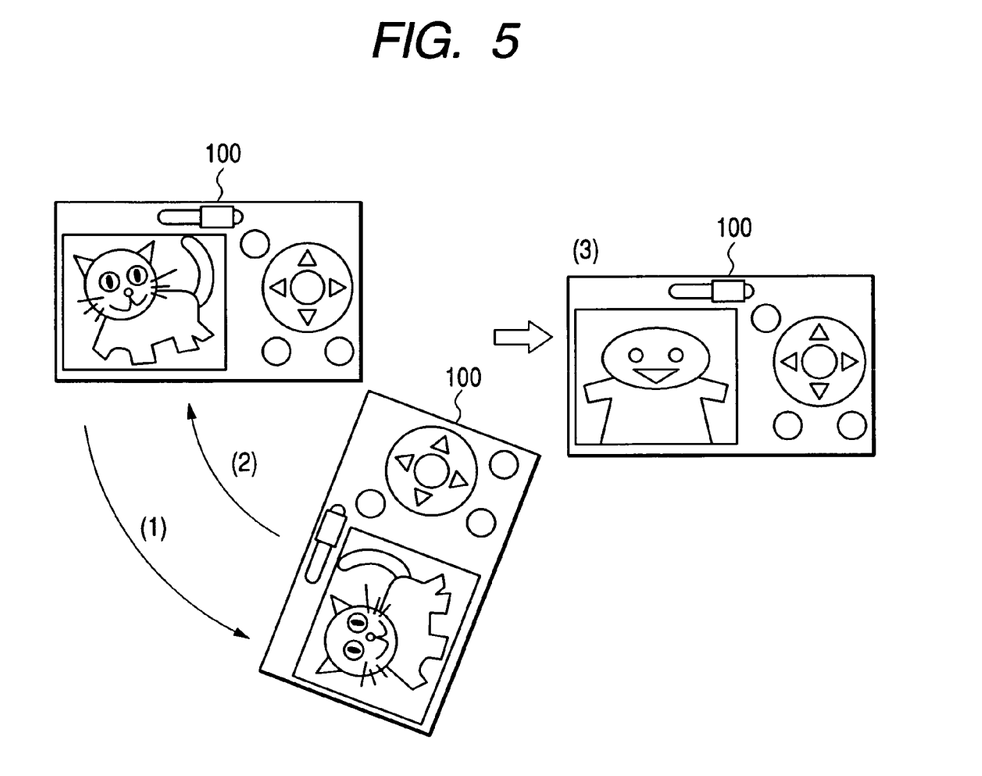
FIG. 5 is diagrams illustrating an example of a change in captured images.

Step S405: The system control unit 107 controls to read next one, four or nine frames of captured images from the storage medium and display the image or images on the display unit 105. If the current image display mode of the digital camera 10 is a one-image display mode, the system control unit 107 controls to display the frame of the next captured image on the display unit 105. If the current image display mode of the digital camera 10 is a four-image display mode, the system control unit 107 controls to display the frames of the next four captured images on the display unit 105. If the current image display mode of the digital camera 10 is a nine-image display mode, the system control unit 107 controls to display the frames of the next nine captured images on the display unit 105. For example, as shown in FIG. 5, if the current image display mode of the digital camera 10 is the one-image display mode and the attitude of the digital camera 10 is returned from the attitude 2 to attitude 1 before the predetermined time T is lapsed, then the frame of the next one captured image is displayed on the display unit 105. In this manner, a user can confirm the next one, four or nine frames of captured images only by swinging once the digital camera 10 along a predetermined direction, without operating the four-way directional button 26.

Step S406: The system control unit 107 judges from the judgement results by the attitude detector unit 110 whether the attitude of the digital camera 10 changes from the attitude 1 to attitude 3. If it is judged that the attitude of the digital camera 10 changed from the attitude 1 to attitude 3, the flow advances to Step S407, whereas if not, the flow returns to Step S401.

Step S407: The system control unit 107 starts clocking for the predetermined time T.

Step S408: The system control unit 107 judges whether the predetermined time T lapsed. If not, the flow advances to Step S409, whereas if lapsed, the flow returns to Step S401. If the predetermined time T lapsed, it is judged that the digital camera was not swung along a predetermined direction.

Step S409: The system control unit 107 judges from the judgement results by the attitude detector unit 110 whether the attitude of the digital camera 10 is changed from the attitude 3 back to attitude 1. Namely, the system control unit 107 judges whether the attitude of the digital camera 10 returns to the original attitude before the predetermined time T is lapsed. If it is judged that the attitude of the digital camera 10 is changed from the attitude 3 back to attitude 1, the flow advances to Step S410, whereas if not, the flow returns to Step S408.

Step S410: The system control unit 107 controls to read previous one, four or nine frames of captured images from the storage medium and display the image or images on the display unit 105. If the current image display mode of the digital camera 10 is the one-image display mode, the system control unit 107 controls to display the frame of the previous captured image on the display unit 105. If the current image display mode of the digital camera 10 is the four-image display mode, the system control unit 107 controls to display the frames of the previous four captured images on the display unit 105. If the current image display mode of the digital camera 10 is the nine-image display mode, the system control unit 107 controls to display the frames of the previous nine captured images on the display unit 105. In this manner, a user can confirm the previous one, four or nine frames of captured images only by swinging once the digital camera 10 along the predetermined direction, without operating the four-way directional button 26.

As described above, according to the digital camera 10 of the first embodiment, it is possible to display next or previous one, four or nine frames of captured images only by swinging once the digital camera 10 along the predetermined direction.

The first embodiment may be configured in such a manner that it is judged at Step S401 whether the attitude of the digital camera 10 changes from the attitude 2 to attitude 4 and it is judged at Step S404 whether the attitude of the digital camera 10 changes from the attitude 4 to attitude 2. Similarly, the first embodiment may be configured in such a manner that it is judged at Step S406 whether the attitude of the digital camera 10 changes from the attitude 2 to attitude 1 and it is judged at Step S409 whether the attitude of the digital camera 10 changes from the attitude 1 to attitude 2.

Second Embodiment

The second embodiment is an embodiment partially modifying the first embodiment. Only different points from the first embodiment will therefore be described. A digital camera 10 of the second embodiment has a clock display function of displaying an image including a present time (hereinafter called a clock display screen). The clock display function can be turned ON or OFF on the setting menu.

In the second embodiment, Steps S405 and S410 of the first embodiment are changed in the following manner.

Figure 6:
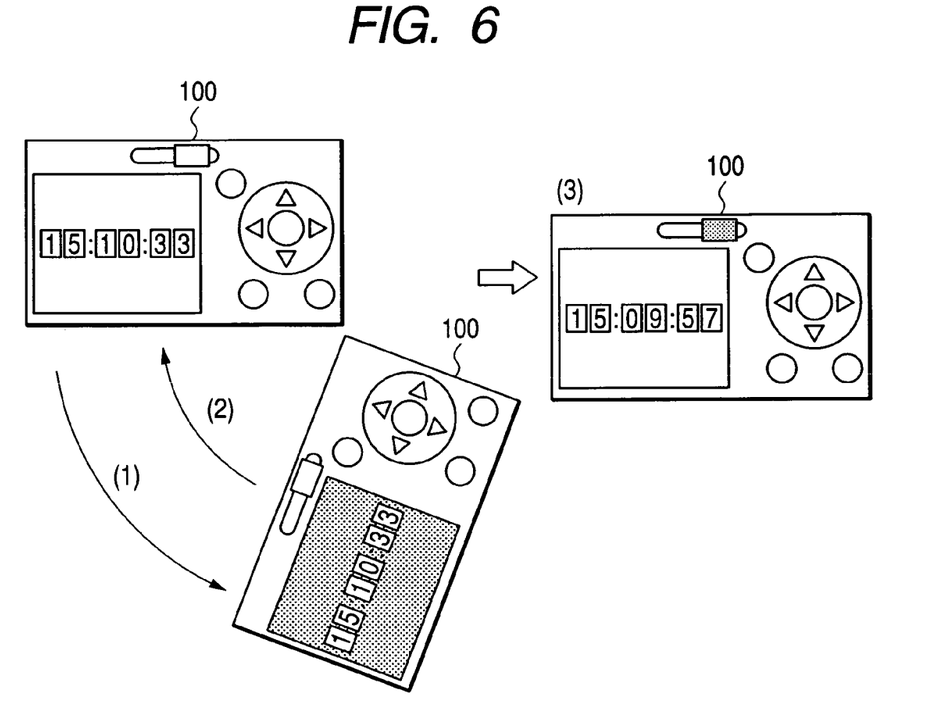
FIG. 6 is diagrams illustrating an example of a change in clock display screens.

Step S405: If the clock display function is ON, the system control unit 107 changes the clock display screen displayed on the display unit 105 to another clock display screen. For example, as shown in FIG. 6, the clock display screen is changed to a clock display screen having a different background color. In this manner, a user can select easily a desired clock display screen only by swinging once the digital camera 10 along the predetermined direction, without operating the menu button 24, four-way directional button 26 and SET button 27.

Step S410: A similar process to Step S405 is executed.

As described above, according to the digital camera 10 of the second embodiment, a desired clock display screen can be selected easily only by swinging once the digital camera 10 along the predetermined direction. A user can enjoy also color variations of the clock display screen.

Third Embodiment

The third embodiment is an embodiment partially modifying the first embodiment. Only different points from the first embodiment will therefore be described. A digital camera 10 of the third embodiment is in conformity with a digital print order format (DPOF), and has a direct print function of transmitting captured images directly to a printer.

In the third embodiment, Steps S405 and S410 of the first embodiment are changed in the following manner.

Figure 7A:
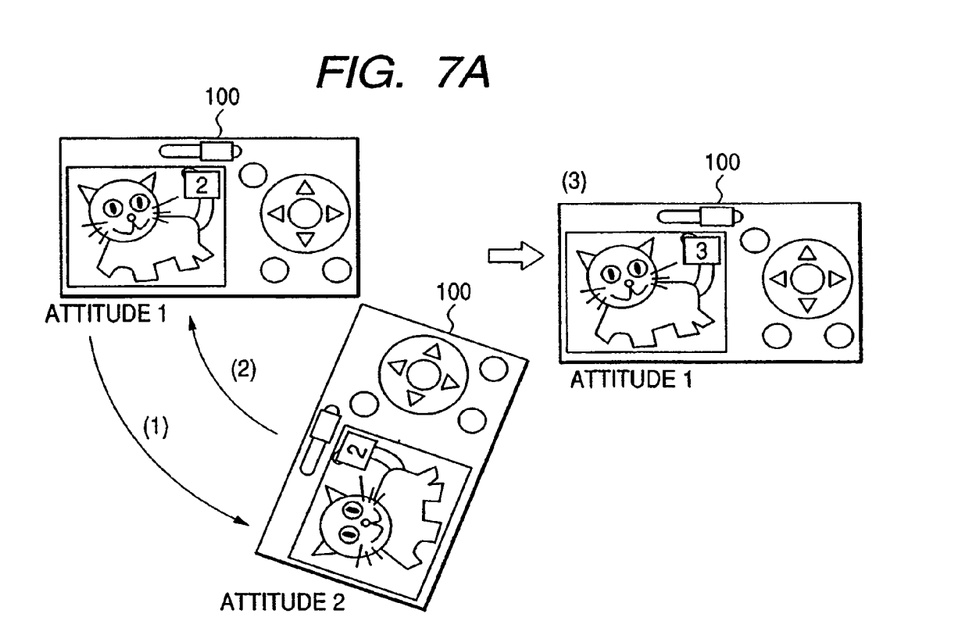
FIGS. 7A and 7B are diagrams illustrating an example of a change in the numbers of prints.

Step S405: As shown in FIG. 7A, the system control unit 107 adds "1" to the number of prints of a captured image displayed on the display unit 105. A user can therefore increase easily the number of prints of a desired captured image only by swinging once the digital camera 10 along a predetermined direction, without operating the menu button 24, four-way directional button 26 and SET button 27.

Figure 7B:
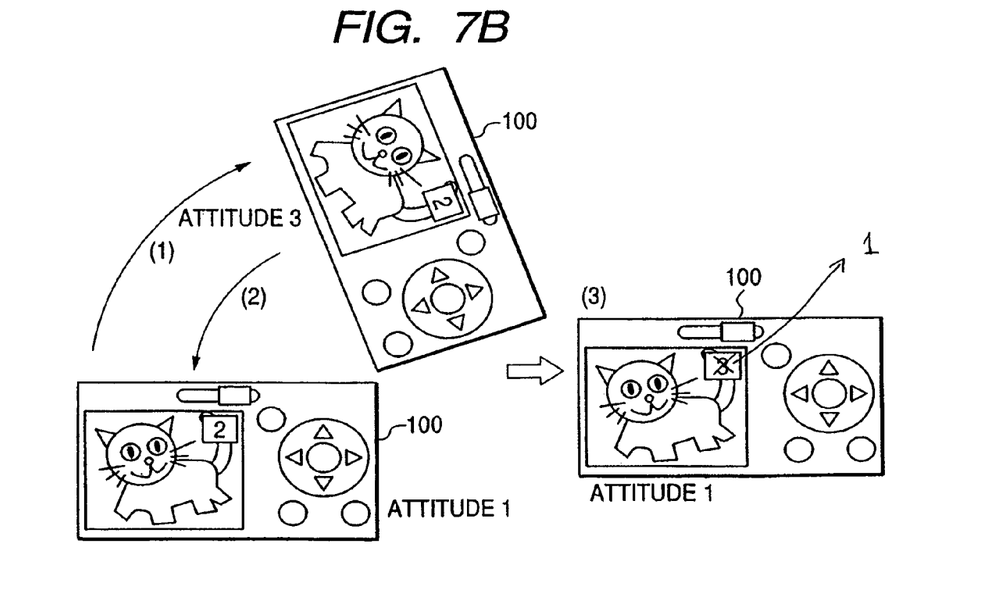

Step S410: As shown in FIG. 7B, the system control unit 107 subtracts "1" from the number of prints of a captured image displayed on the display unit 105. A user can therefore reduce easily the number of prints of a desired captured image only by swinging once the digital camera 10 along the predetermined direction, without operating the menu button 24, four-way directional button 26 and SET button 27.

As described above, according to the digital camera 10 of the third embodiment, the number of prints of a desired captured image can be set easily only by swinging once the digital camera 10 along the predetermined direction.

In the third embodiment, although the number of prints of a desired captured image is changed, print sheets may be changed.

Fourth Embodiment

The fourth embodiment is an embodiment partially modifying the first embodiment. Only different points from the first embodiment will therefore be described.

In the fourth embodiment, Steps S405 and S410 of the first embodiment are changed in the following manner.

Step S405: The system control unit 107 changes the image display mode to the four-image display mode if the present image display mode is the one-image display mode; the image display mode to the nine-image display mode if the present image display mode is the four-image display mode; or the image display mode to the one-image display mode if the present image display mode is the nine-image display mode. A user can therefore change the image display mode in the forward direction only by swinging once the digital camera 10 along a predetermined direction, without operating the menu button 24, four-way directional button 26 and SET button 27.

Step S410: The system control unit 107 changes the image display mode to the nine-image display mode if the present image display mode is the one-image display mode; the image display mode to the one-image display mode if the present image display mode is the four-image display mode; or the image display mode to the four-image display mode if the present image display mode is the nine-image display mode. A user can therefore change the image display mode in the reverse direction only by swinging once the digital camera 10 along the predetermined direction, without operating the menu button 24, four-way directional button 26 and SET button 27.

As described above, according to the digital camera 10 of the fourth embodiment, the image display mode can be changed in the normal or reverse direction only by swinging once the digital camera 10 along the predetermined direction.

The fourth embodiment is applicable to changing the capturing mode such as a sports mode and a portrait mode in this order or reverse order thereof. Further, the fourth embodiment is applicable to changing a mode among a one-frame capturing mode of capturing one frame of a still image, a low speed capturing mode of capturing a plurality of frames of still images, a higher speed capturing mode higher than the low speed capturing mode and a moving image capturing mode of capturing moving images in this order or reverse order thereof.

Fifth Embodiment

The fifth embodiment is an embodiment partially modifying the first embodiment. Only different points from the first embodiment will therefore be described.

In the fifth embodiment, Steps S405 and S410 of the first embodiment are changed in the following manner.

Step S405: The system control unit 107 deletes a captured image presently displayed on the display unit 105 or a captured image presently selected by the cursor, from the storage medium. A user can therefore delete a desired image only by swinging once the digital camera 10 along a predetermined direction, without operating the menu button 24, four-way directional button 26 and SET button 27.

Step S410: A similar process to Step S405 is executed.

As described above, according to the digital camera 10 of the fifth embodiment, a desired captured image can be deleted from the storage medium only by swinging once the digital camera 10 along the predetermined direction.

Sixth Embodiment

The sixth embodiment is an embodiment partially modifying the first embodiment. Only different points from the first embodiment will therefore be described.

In the sixth embodiment, Steps S405 and S410 of the first embodiment are changed in the following manner.

Step S405: If the image display mode of the digital camera 10 is the one-image display mode, the system control unit 107 changes the image display mode to an enlarged display mode to enlarge a predetermined area of a captured image presently displayed on the display unit 105 and display it on the display unit 105. If the image display mode of the digital camera 10 is the enlarged display mode, the system control unit 107 changes the image display mode to the one-image display mode to display the whole of the captured image presently displayed on the display unit 105, on the display unit 105. A user can therefore confirm the desired area or the whole of a desired image only by swinging once the digital camera 10 along a predetermined direction, without operating the menu button 24, four-way directional button 26 and SET button 27.

Step S410: A similar process to Step S405 is executed.

As described above, according to the digital camera 10 of the sixth embodiment, a desired area or the whole of a desired image can be confirmed only by swinging once the digital camera 10 along the predetermined direction.

Seventh Embodiment

The seventh embodiment is an embodiment partially modifying the first embodiment. Only different points from the first embodiment will therefore be described.

In the seventh embodiment, Steps S405 and S410 of the first embodiment are changed in the following manner.

Step S405: The system control unit 107 changes a present value to a different value of at least one of a resolution, an image quality, an ISO sensitivity, a white balance, a color space and a development parameter. A user can therefore change a present value to a different value of at least one of the resolution, image quality, ISO sensitivity, white balance, color space and development parameter, only by swinging once the digital camera 10 along a predetermined direction, without operating the menu button 24, four-way directional button 26 and SET button 27.

Step S410: A similar process to Step S405 is executed.

As described above, according to the digital camera 10 of the seventh embodiment, it is possible to change a present value to a different value of at least one of the resolution, image quality, ISO sensitivity, white balance, color space and development parameter, only by swinging once the digital camera 10 along the predetermined direction.

Eighth Embodiment

The eighth embodiment is an embodiment partially modifying the first embodiment. Only different points from the first embodiment will therefore be described.

In the eighth embodiment, Steps S405 and S410 of the first embodiment are changed in the following manner.

Step S405: The system control unit 107 changes present data to desired data of at least one of a startup sound, a shutter sound, an operation sound, a self timer sound and a startup screen. The startup sound is output from a speaker when the digital camera 10 starts up. The shutter sound is output from the speaker when the shutter is released. The operation sound is output from the speaker when a button or the like is operated. The self timer sound is output from the speaker when an image is to be captured by using a self timer. The startup screen is an image displayed on the display unit 105 when the digital camera 10 starts up. A user can therefore change present data to desired data of at least one of the startup sound, shutter sound, operation sound, self timer sound and startup screen only by swinging once the digital camera 10 along a predetermined direction, without operating the menu button 24, four-way directional button 26 and SET button 27.

Step S410: A similar process to Step S405 is executed.

As described above, according to the digital camera 10 of the eighth embodiment, it is possible to change present data to desired data of at least one of the startup sound, shutter sound, operation sound, self timer sound and startup screen, only by swinging once the digital camera 10 along the predetermined direction.

Ninth Embodiment

The ninth embodiment is an embodiment partially modifying the first embodiment. Only different points from the first embodiment will therefore be described.

In the ninth embodiment, Steps S405 and S410 of the first embodiment are changed in the following manner.

Step S405: The system control unit 107 turns OFF the power of the digital camera 10. A user can therefore turn OFF the power of the digital camera 10 only by swinging the digital camera 10 in a predetermined direction, without operating the power switch 21

Step S410: A similar process to Step S405 is executed.

As described above, according to the digital camera 10 of the ninth embodiment, it is possible to turn OFF the power of the digital camera 10 only by swinging once the digital camera 10 along the predetermined direction.

Tenth Embodiment

The tenth embodiment is an embodiment partially modifying the first embodiment. Only different points from the first embodiment will therefore be described.

In the tenth embodiment, Steps S405 and S410 of the first embodiment are changed in the following manner.

Step S405: The system control unit 107 turns ON the power if the digital camera 10 is in the power saving state. A user can therefore turn ON the power of the digital camera 10 only by swinging once the digital camera 10 along a predetermined direction, without operating the power switch 21 and the like.

Step S410: A similar process to Step S405 is executed.

As described above, according to the digital camera 10 of the tenth embodiment, it is possible to turn ON the power of the digital camera 10 only by swinging once the digital camera 10 along the predetermined direction.

Eleventh Embodiment

The above-described first to tenth embodiments may be combined in various ways. For example, if the digital camera 10 is provided with all the functions of the first to tenth embodiments, one of the functions of the first to tenth embodiments of the digital camera 10 may be turned ON or OFF.

Other Embodiments

It is needless to say that the object of the present invention can be achieved by supplying a storage medium storing software program codes realizing the functions of each embodiment described above to a system or an apparatus and making a computer (or CPU or MPU) of the system or apparatus read and execute the program codes stored in the storage medium.

In this case, the software program codes themselves realize the embodiment functions. Therefore, the program codes themselves and the storage medium storing the program codes constitute the present invention.

The storage medium for storing such program codes may be a flexible disk, a hard disk, an optical disk, a magneto optical disk, a CD-ROM, a CD-R, a magnetic tape, a non-volatile memory card, a ROM or the like.

It is needless to say that the invention includes the case wherein the functions of the embodiments are realized not only by executing the program codes read by a computer but also by making an OS (basic system or operating system) or the like execute a portion or the whole of actual processes in accordance with the instructions of the program codes.

It is needless to say that the invention includes the case wherein the functions of the embodiments are realized by writing the program codes read from the storage medium in a memory of a function expansion board inserted into the computer or a function expansion unit connected to the computer, and making a CPU or the like of the function expansion board or function expansion unit execute a portion or the whole of actual processes in accordance with the instructions of the program codes.

The above-described embodiments are merely exemplary of the present invention, and are not construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2004-272507 filed on Sep. 17, 2004, which is hereby incorporated by reference herein.

What is claimed is:

1. An image capturing apparatus comprising:
an image capture unit that captures an image;
an interface unit that writes an image file including the captured image to a storage medium;
a display unit that displays the captured image stored in the storage medium;
an attitude detecting unit that detects an attitude of the image capturing apparatus; and
a control unit that (a) controls the image capturing apparatus to display one captured image on the display unit if the attitude of the image capturing apparatus is changed from a first attitude to a second attitude different from the first attitude and then is returned from the second attitude to the first attitude within a predetermined time when an image display mode of the image capturing apparatus is a multiple image display mode for displaying a plurality of captured images on the display unit, and (b) controls the image capturing apparatus to display the plurality of captured images on the display unit if the attitude of the image capturing apparatus is changed from the first attitude to the second attitude and then is returned from the second attitude to the first attitude within the predetermined time when the image display mode of the image capturing apparatus is a single image display mode for displaying one captured image on the display unit, wherein the first attitude and the second attitude are produced by changing a position of the image capturing apparatus.

2. The image capturing apparatus according to claim 1, wherein the control unit controls the image capturing apparatus not to display one captured image on the display unit if the attitude of the image capturing apparatus is changed from the first attitude to the second attitude and then is not returned from the second attitude to the first attitude within the predetermined time when the image display mode of the image capturing apparatus is the multiple image display mode, and wherein the control unit controls the image capturing apparatus not to display the plurality of captured images on the display unit if the attitude of the image capturing apparatus is changed from the first attitude to the second attitude and then is not returned from the second attitude to the first attitude within the predetermined time when the image display mode of the image capturing apparatus is the single image display mode.

3. The image capturing apparatus according to claim 1, wherein the image capturing apparatus is a digital camera.

4. The image capturing apparatus according to claim 1, wherein the multiple image display mode is one of a four-image display mode for displaying four captured images on the display unit and a nine-image display mode for displaying nine captured images on the display unit.

5. A method of controlling an image capturing apparatus which includes (a) an image capture unit that captures an image, (b) an interface unit that writes an image file including the captured image to a storage medium, and (c) a display unit that displays the captured image stored in the storage medium, the method comprising the steps of:

detecting an attitude of the image capturing apparatus;

controlling the image capturing apparatus to display one captured image on the display unit if the attitude of the image capturing apparatus is changed from a first attitude to a second attitude different from the first attitude and then is returned from the second attitude to the first attitude within a predetermined time when an image display mode of the image capturing apparatus is a multiple image display mode for displaying a plurality of captured images on the display unit; and controlling the image capturing apparatus to display the plurality of captured images on the display unit if the attitude of the image capturing apparatus is changed from the first attitude to the second attitude and then is returned from the second attitude to the first attitude within the predetermined time when the image display mode of the image capturing apparatus is a single image display mode for displaying one captured image on the display unit, wherein the first attitude and the second attitude are produced by changing a position of the image capturing apparatus.

6. The method according to claim 5, further comprising the steps of:

controlling the image capturing apparatus not to display one captured image on the display unit if the attitude of the image capturing apparatus is changed from the first attitude to the second attitude and then is not returned from the second attitude to the first attitude within the predetermined time when the image display mode of the image capturing apparatus is the multiple image display mode; and controlling the image capturing apparatus not to display the plurality of captured images on the display unit if the attitude of the image capturing apparatus is changed from the first attitude to the second attitude and then is not returned from the second attitude to the first attitude within the predetermined time when the image display mode of the image capturing apparatus is the single image display mode.

7. The method according to claim 5, wherein the image capturing apparatus is a digital camera.

8. The method according to claim 5, wherein the multiple image display mode is one of a four-image display mode for displaying four captured images on the display unit and a nine-image display mode for displaying nine captured images on the display unit.

9. An image capturing apparatus comprising:

an image capture unit that captures an image;

an interface unit that writes an image file including the captured image to a storage medium;

a display unit that displays the captured image stored in the storage medium;

an attitude detecting unit that detects an attitude of the image capturing apparatus; and a control unit that (a) controls the image capturing apparatus to enlarge a predetermined area of the captured image displayed on the display unit if the attitude of the image capturing apparatus is changed from a first attitude to a second attitude different from the first attitude and then is returned from the second attitude to the first attitude within a predetermined time when an image display mode of the image capturing apparatus is a single image display mode for displaying a whole of the captured image displayed on the display unit, and (b) controls the image capturing apparatus to display the whole of the captured image displayed on the display unit if the attitude of the image capturing apparatus is changed from the first attitude to the second attitude and then is returned from the second attitude to the first attitude within the predetermined time when the image display mode of the image capturing apparatus is an enlarged display mode for enlarging the predetermined area of the captured image displayed on the display unit, wherein the first attitude and the second attitude are produced by changing a position of the image capturing apparatus.

10. The image capturing apparatus according to claim 9, wherein the control unit controls the image capturing apparatus not to enlarge the predetermined area of the captured image displayed on the display unit if the attitude of the image capturing apparatus is changed from the first attitude to the second attitude and then is not returned from the second attitude to the first attitude within the predetermined time when the image display mode of the image capturing apparatus is the single image display mode, and wherein the control unit controls the image capturing apparatus not to display the whole of the captured image displayed on the display unit if the attitude of the image capturing apparatus is changed from the first attitude to the second attitude and then is not returned from the second attitude to the first attitude within the predetermined time when the image display mode of the image capturing apparatus is the enlarged display mode.

11. The image capturing apparatus according to claim 9, wherein the image capturing apparatus is a digital camera.

12. A method of controlling an image capturing apparatus which includes (a) an image capture unit that captures an image, (b) an interface unit that writes an image file including the captured image to a storage medium, and (c) a display unit that displays the captured image stored in the storage medium, the method comprising the steps of:

detecting an attitude of the image capturing apparatus;

controlling the image capturing apparatus to enlarge a predetermined area of the captured image displayed on the display unit if the attitude of the image capturing apparatus is changed from a first attitude to a second attitude different from the first attitude and then is returned from the second attitude to the first attitude within a predetermined time when an image display mode of the image capturing apparatus is a single image display mode for displaying a whole of the captured image displayed on the display unit; and controlling the image capturing apparatus to display the whole of the captured image displayed on the display unit if the attitude of the image capturing apparatus is changed from the first attitude to the second attitude and then is returned from the second attitude to the first attitude within the predetermined time when the image display mode of the image capturing apparatus is an enlarged display mode for enlarging the predetermined area of the captured image displayed on the display unit, wherein the first attitude and the second attitude are produced by changing a position of the image capturing apparatus.

13. The method according to claim 12, further comprising the steps of:

controlling the image capturing apparatus not to enlarge the predetermined area of the captured image displayed on the display unit if the attitude of the image capturing apparatus is changed from the first attitude to the second attitude and then is not returned from the second attitude to the first attitude within the predetermined time when the image display mode of the image capturing apparatus is the single image display mode; and controlling the image capturing apparatus not to display the whole of the captured image displayed on the display unit if the attitude of the image capturing apparatus is changed from the first attitude to the second attitude and then is not returned from the second attitude to the first attitude within the predetermined time when the image display mode of the image capturing apparatus is the enlarged display mode.

14. The method according to claim 12, wherein the image capturing apparatus is a digital camera.

* * * * *